Jan. 1, 1935.                G. EGLOFF                1,986,190
                     TREATMENT OF HYDROCARBON OILS
                         Filed March 23, 1931
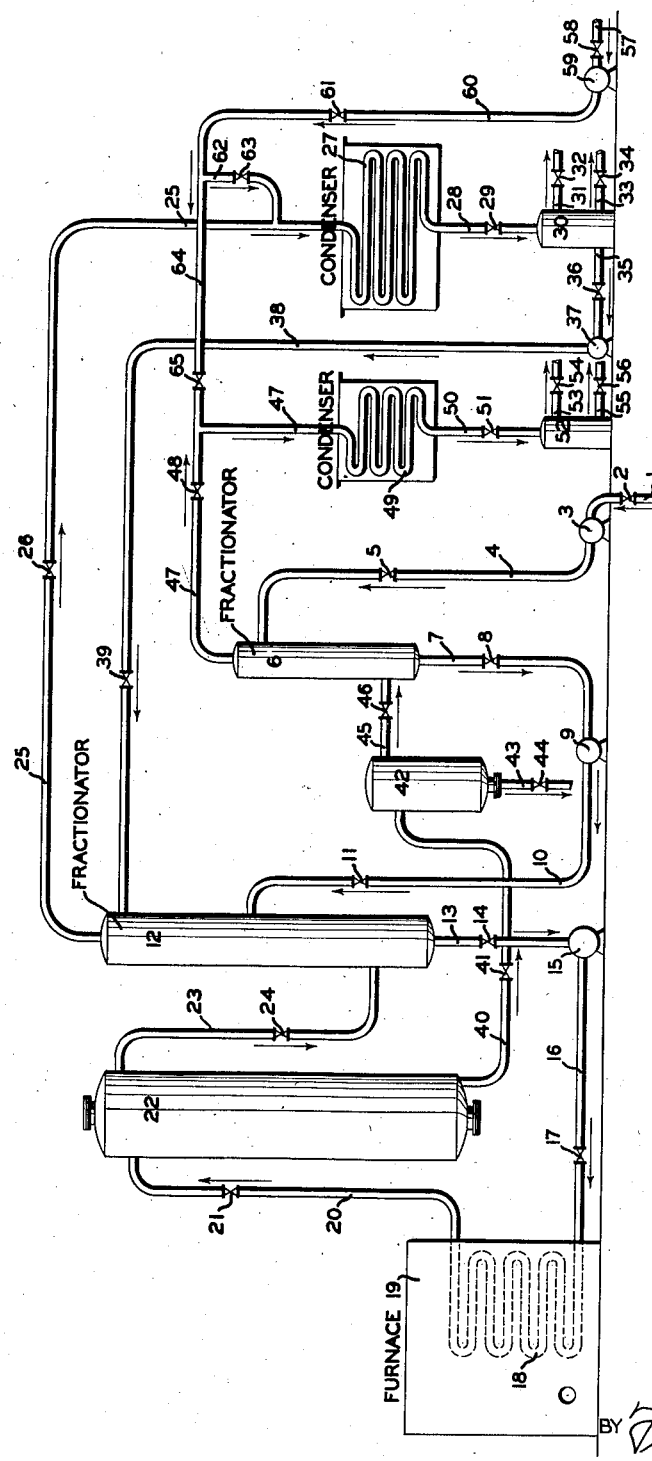
INVENTOR
GUSTAV EGLOFF
BY Frank L. Belknap
ATTORNEY Patented Jan. 1, 1935

1,986,190

UNITED STATES PATENT OFFICE 1,986,190

TREATMENT OF HYDROCARBON OILS

Gustav Egloff, Chicago, Ill., assignor to Universal Oil Products Company, Chicago, Ill., a corporation of South Dakota Application March 23, 1931, Serial No. 524,442

1 Claim. (Cl. 196—42)

This invention relates to the treatment of hydrocarbon oils and refers more particularly to the treatment of fractions produced by the cracking of relatively heavy hydrocarbon oils under elevated temperatures and pressures.

More specifically the invention contemplates the treatment of cracked vapors prior to and during their condensation by suitable purifying agents so that the condensed liquid portions of approximate gasoline boiling point range are of a nature requiring less subsequent treatment to produce oils of a degree of refinement necessary for their use as motor fuel.

In a specific embodiment of the invention cracked vapors evolved from the various fractionating devices of a cracking unit are contacted with treating agents such as hypochlorous acid prior to their passage through condensers. The action of such reagents is substantially of an oxidizing nature resulting in the transformation of mercaptans into disulfides which are non-reactive to the "doctor" test solution employed for determining the degree of sourness of light petroleum distillates. It is characteristic of the invention that this treatment is conducted while the vapors are still in a relatively hot and reactive condition so that less reagent and less time is required for effecting desired reactions, with subsequent saving in cost. Hypochlorous acid has been used as a generic term to include the solutions of alkaline hypochlorites produced when chlorine is led into alkaline hydrates of varying concentrations and the reaction indicated leading to the production of disulfides from mercaptans is used to typify any number of reactions of such reagents with sulfur compounds leading to the elimination of the same or their transformation into products of a less reactive character. For the production of the cracked vapors to be treated heavy hydrocarbon charging oils are first contacted with cracked vapors in the fractionating equipment of a cracking unit and pumped along with reflux condensates through tubular heating elements and succeeding enlarged chambers constituting reaction zones, the vapors from the reaction zones passing to fractionators in which the boiling range of the emergent vapors is controlled by proper recirculation of end products, and the bottoms passed to auxiliary fractionating equipment under greatly reduced pressure wherein additional amounts of cracked vapors are produced and evolved to contact with the incoming raw oil. The vapors produced from different portions of the fractionating equipment may be treated by varying amounts and concentrations of hypochlorite reagent suitable to their physical and chemical characteristics. The solution of treating agent may be fed to the cracked vapor lines from a common header or different solutions may be used on the vapors from different points.

To enable the presentation of a clear and concise description of an operation typical of the process of the invention reference is made to the attached diagrammatic drawing which shows one arrangement of equipment suitable for effecting its aims and objects. Raw oil charging stocks such as topped crudes, the relatively heavy distillates from the same or from such hydrocarbonaceous materials as coals, shales, etc., may be taken by pump 3 through line 1 containing valve 2 and discharged through line 4 containing valve 5 into fractionator 6. This fractionator receives vapors evolved as pressure upon the heavy liquid portions of the cracked products is released to substantially atmospheric and the raw oil fed assists in the partial fractionation of such vapors. The liquid refluxes from fractionator 6, pass through line 7 containing valve 8 to pump 9 and are discharged through line 10 containing valve 11 to fractionator 12 which is provided to enable separation of vapors from the reaction zone into those of desired boiling point range and reflux condensates amenable to retreatment. The preheated raw oil and such reflux condensates pass through line 13 containing valve 14 to pump 15 which discharges through line 16 containing valve 17 to heating element 18 disposed in furnace 19. Heating element 18 may be of any suitable type and may preferably consist of lengths of pipe connected to produce a continuous tubular element. During passage through the heating element a suitable temperature rise is effected on the products so that heat is added necessary for the completion of conversion reactions in a succeeding reaction zone, the temperatures employed being dependent upon the nature of the charging oil and the pressure in the reaction zone, though a range of from 750 to 1000° F. more or less will cover the temperatures most commonly used. Pressures employed are preferably superatmospheric and may range from approximately 100 to 4000 lbs. per square inch more or less. The heated products pass through line 20 containing valve 21 to reaction chamber 22 in which such conversions and reconversions occur. The continuous removal of liquids from reaction chamber 22 is permitted by the use of line 40 containing valve 41, the latter valve being manipulated to allow decrease of pressure to substantially atmospheric which permits of the rapid evolution of low boiling products in distillation chamber 42 following. Vapors from reaction chamber 22 pass to primary fractionator 12 through line 23 containing valve 24. This chamber is provided with line 43 containing valve 44 for the removal of non-vaporized heavy liquid residues and line 45 containing valve 46 for the transference of vapors to auxiliary fractionator 6. The vapors from this fractionator pass through line 47 containing valve 48 to condenser 49 wherein they are partially liquefied and the cooled products pass to line 50 and valve 51 to receiver 52, this being provided with line 53 and valve 54 for the removal of fixed gases and line 55 and valve 56 for the removal of condensed liquids. At a point preceding the condenser the treating reagent is added from line 64 as will be described later. The vapors from fractionator 12 pass through line 25 containing valve 26 to condenser 27, the cooled products leaving through line 28 and valve 29 to receiver 30. This receiver is provided with line 31 and valve 32 for the disposal of fixed gases and line 33 containing valve 34 for removal to suitable storage of properly refined liquid products. To assist in the control of the boiling point range of the vapors emergent from fractionator 12 pump 37 may take a suitable portion of the end product liquids from receiver 30 through line 35 containing valve 36 and discharge them through line 38 containing valve 39 to the top of the fractionator as shown. Treating agent is added to vapor line 25 prior to condenser 27 from line 62 containing valve 63, line 62 branching from reagent header 64. Line 57 with valve 58 typifies any supply line for treating reagent and pump 59 a pump used to transmit reagent to the vapor lines, this pump discharging into line 60 containing valve 61. It is evident from the description of the operation taken as an example that the vapors coming from fractionator 12 may be at a pressure equivalent to or differential with the process pressure so that the vapors at a point preceding condenser 27 are at a relatively high temperature and pressure, both conditions materially assisting the treating reactions. However, good effects are obtained by the use of the reagent in vapor lines corresponding to line 47 preceding condenser 49 even though the temperature is lower due to the pressure reduction at valve 41 prior to distilling chamber 42.

It is evident from the foregoing detailed description of an operation that the invention comprises a process capable of wide and diverse applications in the refining of cracked vapors. As indicated the strength of the solution of hypochlorite may be varied to suit particular needs and also the base may be different under different circumstances. In addition to the general reactions of polymerization, oxidation and desulfurization which may occur, a certain amount of chlorine may be fixed in the hydrocarbon radicals or their sulfur derivatives necessitating light sulfuric acid treatment for their removal. By increasing the alkalinity of the treating reagent this tendency may be overcome to a large degree as the hydrochloric acid evolved will be absorbed by the excess of alkali.

As an example of an operation falling within the scope of the invention and the results obtainable therefrom the following may be cited. A heavy gas oil distillate of approximately 30° A. P. I. gravity may be cracked under a pressure of 250 pounds per square inch in the reaction and more condensing zones and the temperature at the exit of the heating element of approximately 935° F. in an apparatus similar to the one described with the production of approximately 60 to 65% of hydrocarbons boiling within the range required for commercial motor fuels, approximately 5% of this product coming from the fractionation of the residual accumulations in the reaction chamber upon the reduction of pressure. The gasolines produced by the acid treatment and rerunning of the combined pressure distillates from both receivers may contain as high as 0.25% sulfur, 100 mgs. of gum by the copper dish method and reactive sulfur compounds sufficient to cause a decidedly positive reaction with "doctor" solution necessitating sweetening treatment to remove malodorous constituents and render the gasoline saleable. By injecting amounts of hypochlorite solution equivalent to approximately 1% by volume of the distillates produced into the vapor line it may be found that the resultant gasolines after the acid treatment and rerunning of the pressure distillates may have a gum content as low as 25 mgs., a sulfur content of less than 0.1% and minimum amounts of sulfur compounds reactive to the "doctor" solution so that final sweetening is not necessary. This example is more or less typical of results that may be obtained but many other types of operation are possible and operation with many other kinds of raw oil charging stocks for the production therefrom of maximum yields of high quality gasoline.

I claim:

In the cracking of hydrocarbon oils wherein the vaporous gasoline-containing mixture is dephlegmated to condense and separate fractions thereof heavier than gasoline, and the gasoline vapors then finally condensed; the improvement which comprises introducing hypochlorous acid to the vapors between the dephlegmation and final condensation steps and finally condensing the vapors in the presence of the hypochlorous acid.

GUSTAV EGLOFF.